United States Patent
Williams, Jr. et al.

(10) Patent No.: US 11,140,746 B2
(45) Date of Patent: Oct. 5, 2021

(54) WASHROOM DEVICE INSTALLATION SYSTEM

(71) Applicant: Kimberly-Clark Worldwide, Inc., Neenah, WI (US)

(72) Inventors: Frederick J. Williams, Jr., Cumming, GA (US); Alexandra L. Wilson, Woodstock, GA (US); Babak R. Ghazi, Smyrna, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 40 days.

(21) Appl. No.: 16/641,576

(22) PCT Filed: Aug. 31, 2017

(86) PCT No.: PCT/US2017/049765
§ 371 (c)(1),
(2) Date: Feb. 24, 2020

(87) PCT Pub. No.: WO2019/045745
PCT Pub. Date: Mar. 7, 2019

(65) Prior Publication Data
US 2020/0359454 A1    Nov. 12, 2020

(51) Int. Cl.
| | |
|---|---|
| G05B 19/042 | (2006.01) |
| A47K 10/48 | (2006.01) |
| H04W 84/18 | (2009.01) |
| H04W 8/24 | (2009.01) |
| H04W 56/00 | (2009.01) |
| H04W 60/04 | (2009.01) |

(52) U.S. Cl.
CPC ............. *H04W 84/18* (2013.01); *H04W 8/24* (2013.01); *H04W 56/002* (2013.01); *H04W 60/04* (2013.01)

(58) Field of Classification Search
None
See application file for complete search history.

(56) References Cited

U.S. PATENT DOCUMENTS

| | | |
|---|---|---|
| 2008/0218334 A1 | 9/2008 | Pitchers et al. |
| 2009/0066473 A1 | 3/2009 | Simons |
| 2010/0138007 A1 | 6/2010 | Clark et al. |
| 2014/0022940 A1 | 1/2014 | Apte et al. |
| 2014/0108943 A1 | 4/2014 | Lee et al. |

(Continued)

FOREIGN PATENT DOCUMENTS

| | | |
|---|---|---|
| EP | 1455482 A1 | 9/2004 |
| KR | 20120127803 A | 11/2012 |
| WO | 2019055024 A1 | 3/2019 |

OTHER PUBLICATIONS

HAGLEITNER Hygiene International Gmbh, "HAGLEITNER senseMANAGEMENT the intelligent washroom", Innovative Hygiene, May 29, 2014, URL:https://www.hagleitner.com/fileadmin/usear_upload/brochure/senseMANAGEMENT_ENG_EZS_01.pdf.

(Continued)

*Primary Examiner* — Gary Lafontant

(57) ABSTRACT

A system and method for joining devices to a network according to a protocol that names the joined devices based on a predetermined naming sequence that is common across all devices joined to the network in a given facility.

14 Claims, 3 Drawing Sheets

(56) References Cited

U.S. PATENT DOCUMENTS

| | | | |
|---|---|---|---|
| 2014/0241354 | A1 | 8/2014 | Shuman et al. |
| 2015/0007167 | A1 | 1/2015 | Mody et al. |
| 2015/0195365 | A1 | 7/2015 | Choi et al. |
| 2015/0358777 | A1 | 12/2015 | Gupta |
| 2016/0011752 | A1 | 1/2016 | Subramanian et al. |
| 2016/0065653 | A1 | 3/2016 | Chen et al. |
| 2016/0105292 | A1 | 4/2016 | Choi et al. |
| 2016/0135241 | A1 | 5/2016 | Gujral et al. |
| 2016/0313712 | A1* | 10/2016 | Mohmedi ............. A47K 10/48 |
| 2016/0357522 | A1 | 12/2016 | Wee et al. |
| 2017/0005820 | A1 | 1/2017 | Zimmerman et al. |
| 2017/0034700 | A1 | 2/2017 | Cohen et al. |
| 2017/0111469 | A1 | 4/2017 | Kishore et al. |
| 2017/0372589 | A1* | 12/2017 | Becker et al. ......... G08B 21/22 |
| 2020/0218894 | A1 | 7/2020 | Williams, Jr. et al. |

OTHER PUBLICATIONS

Lumb, David, "How the Internet of Things Is Changing Work", Fast Company.com, Nov. 3, 2015, https://www.fastcompany.com/3052936/how-the-internet-of-things-is-changing-work.

CloudPlugs, "SmartPlug", https://cloudplugs.com/smartplug/.

Weber, John, "Fundamentals of IoT device management", IoT Design, http://iotdesign.embedded-computing.com/articles/fundamentals-of-iot-device-management/.

\* cited by examiner

WASHROOM DEVICE INSTALLATION SYSTEM

TECHNICAL FIELD

This disclosure generally relates to joining (or installing) devices on a network, for example, a wireless network.

BACKGROUND OF THE DISCLOSURE

Wireless networks are commonplace in many environments. Joining (or installing or commissioning) devices on a network can take many forms. Such a process may result in the device joining the network being assigned or receiving a name or reference identifier that, example, can be used to uniquely or quasi-uniquely identify that device within the network, e.g., for purposes or sending or receiving network communications.

SUMMARY OF THE DISCLOSURE

In general, the subject matter of this specification relates to a system for joining a device, for example, a washroom device such as a hand towel dispenser, to a network. One aspect of the subject matter described in this specification can be implemented in systems that include a data processing apparatus configured to generate, for each of a plurality of facilities, configuration data for end point devices at each facility that associate the end point devices with the respective facility based on a first protocol, wherein: each of the end point devices has a spatial orientation defining its position relative to a position of at least one other of the end point devices in a same facility, the configuration data specify naming information for each of the end point devices to uniquely identify each end point device; and each facility includes at least two different types of end point devices; a mobile installation tool configured, for each facility, to wirelessly communicate installation data to the data processing apparatus for use with the first protocol, wherein the first protocol defines one or more rules for generating the naming information based on (i) a sequence of the end point devices based on the spatial orientations of the end point devices and (ii) a reference defining a starting point for the sequence; and wherein the sequence is the same for each facility regardless of the types or number of end point devices. Other embodiments of this aspect include corresponding methods, apparatus, and computer program products.

Another aspect of the subject matter described in this specification can be implemented in a method comprising: receiving, by a data processing apparatus, installation data from a mobile installation tool; and generating, by the data processing apparatus, for each of a plurality of facilities, configuration data for end point devices at each facility that associate the end point devices with the respective facility based on a first protocol and the installation data, wherein: each of the end point devices has a spatial orientation defining its position relative to a position of at least one other of the end point devices in a same facility, the configuration data specify naming information for each of the end point devices to uniquely identify each end point device; and the first protocol defines one or more rules for generating the naming information based on (i) a sequence of the end point devices based on the spatial orientations of the end point devices and (ii) a reference defining a starting point for the sequence. Other embodiments of this aspect include corresponding systems, apparatus, and computer program products.

Particular embodiments of the subject matter described in this specification can be implemented so as to realize one or more of the following advantages. The device installation system described herein names devices joining the network in a manner that allows immediate recognition of the device location within a facility, such as a washroom or break room, by a quick glance or review of the device name. For example, based on the device name a reader, e.g., facility service attendant, can locate and identify the specific device in a room or area without having to (build and then) consult a table or list or memorize device names and corresponding locations. As such, the location of the device can be immediately recognized based on the device's name. For example, in the context of washroom hand towel dispenser, messages or alerts, including the dispenser's network name may be sent to service personnel when a dispenser needs to be refilled.

Thus through use of such a device naming convention the message or alert can simply include the device name and with that information alone the service personnel can easily locate the dispenser that needs the refill, as opposed to having to include additional location information in the message (which would require a larger message file and/or additional bandwidth and/or additional system resources) or otherwise requiring the service personnel to consult a list or table to determine the location or memorize device locations. Thus system resources are conserved, e.g., either because a shorter file or less transmission bandwidth is required for the message or because additional tables or lists linking device names to locations are not required to be generated.

The details of one or more implementations of the subject matter described in this specification are set forth in the accompanying drawings and the description below. Other features, aspects, and advantages of the subject matter will become apparent from the description, the drawings, and the claims.

Figure 1A:
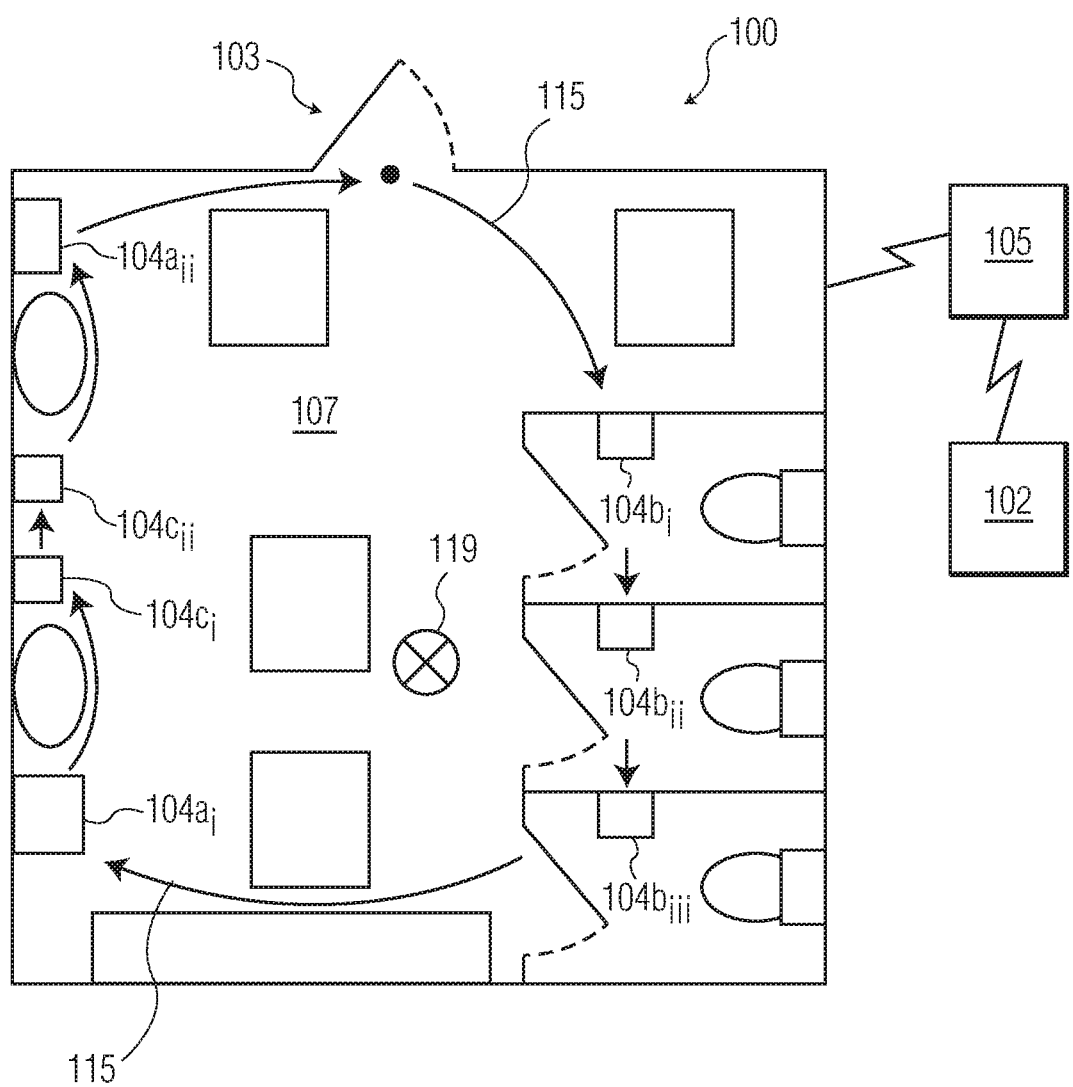
FIG. 1A is a block diagram of an example environment in which a washroom device installation system can be implemented.

Repeat use of reference characters in the present specification and drawings is intended to represent the same or analogous features or elements of the disclosure.

DETAILED DESCRIPTION OF THE DISLOSURE

A naming process can be used to convey certain information about the device within the device's name. For example, a device name may include its device type (e.g., a code corresponding to a type such as mobile phone, laptop), manufacturer name, model number, etc. Thus, a user can readily learn certain information about the device without having to resolve an obtuse number or other identifier (e.g., a quasi-random alpha-numeric string) or cross check a separate database. Such information, for example, may assist a user to readily identify a certain device among a group of devices through a quick visual assessment of the devices.

The present disclosure generally relates to a system for joining (or installing) devices on a network, for example, a wireless network based on a predetermined naming sequence and sequence starting point that is common across all devices in a facility, e.g., a washroom or kitchen or break room. The system includes a data processing apparatus, that generates names for the devices being joined to the network according to a predetermined protocol, and a mobile installation tool that is used to identify such devices and communicate data specifying the device identities to the data processing apparatus for use in the naming process.

More particularly, in some implementations, the mobile installation tool, e.g., a tablet or smart phone with an associated application, is used to accept input specifying a unique identifier for each device in a facility to be joined to the network, e.g., by scanning a bar or QR code or querying the device according to a near-field communication protocol. The mobile installation tool provides the device identity information to the data processing apparatus, e.g., a server, according to a joining sequence such that the joining sequence conveys location information of the devices, relative to other devices in the facility, to the data processing apparatus. The data processing apparatus then names the devices in a facility such that the names carry, and readily convey, the location information of the device. In this way, the name of the device can be used to quickly find the device without more, e.g., without crosschecking a database or list. For example, in the context of a washroom with multiple hand towel dispensers, an alert may be sent notifying a custodian that a particular dispenser is running low on product. Rather than having to include a description or additional information as to the dispenser's exact location or have the custodian check each dispenser until the low product dispenser is identified, the device's name, included in the alert, can be used by the custodian to identify the device to be refilled.

The protocol used to name the devices, when joined to the network, is based on the relative locations of the dispensers within the facility. For example, the protocol can specify the sequence in which the devices are to be joined or named such as starting from the device nearest the entry door in a clockwise direction and continuing in that same direction around the facility until all devices have been joined. Based on this sequence and information, for example, the data processing apparatus includes in the name of the first device in the sequence a unique location descriptor such as, for example, "1." The second device in the sequence would have a location descriptor of "2." This process continues with a similar incrementing or naming convention until each device in the facility is named. Thus when the device name includes a "2" as the location descriptor a reader, e.g., facility custodian, can determine that the device is the second device from the entry door in a clockwise direction. This system is described in more detail with reference to FIG. 1A, which is a block diagram of an example environment in which a washroom device installation system can be implemented, and FIG. 1B, which is a block diagram of an example first protocol.

Figure 1B:
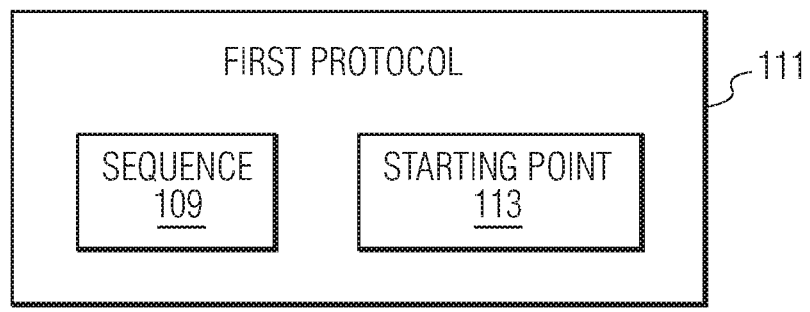
FIG. 1B is a block diagram of an example first protocol.

The environment 100 in FIG. 1A includes a facility 107, e.g., a washroom, one or more end point devices 104, a data processing apparatus 102 and a mobile installation tool 105. More generally, the environment 100 can include one or more facilities 107, for example, a semi-private or public washroom 107, break room 107 or another defined space or area in which end point devices 104 are located. In some implementations, a facility is a closed or defined room or space with at least one door or entry/exit point. An end point device 104 is any device for which the data processing apparatus has or will generate a name for that device 104. In some implementations the device 104 is a network enabled device such that it has a receiver, transmitter or transceiver to communicate, through a wired or wireless connection, over a network and/or with the data processing apparatus 102. A end point device 104 can include, for example, a hand towel dispenser 104a, bath tissue dispenser 104b, hand soap (or other cleansing) dispenser 104c, hand or facial care dispenser (not pictured), surface cleaning, sanitizing or disinfecting dispenser (not pictured) including for toilets or urinals, and/or the like, door opening/closing counter, etc., each of these being a different type of end point device 104. As used herein, joining (or being installed on) a network means associating a device 104 with that network or the data processing apparatus 102 such that the data processing apparatus 102 can generate (and optionally assign) a name for that device 104, e.g., to identify that device on the network for, for example, sending and receiving messages with that device 104.

As described above, the data processing system 102, in some implementations, can communicate with devices 104 across wireless or wired channels, or some combination thereof. For example, the data processing apparatus 102 includes a transceiver and microprocessor to facilitate such communications. In some implementations, the data processing apparatus 102 is connected to a WAN or LAN to communicate to and with the end point devices 104 and other devices such as mobile devices, e.g., the mobile installation tool 105, and/or servers.

Figure 1C:
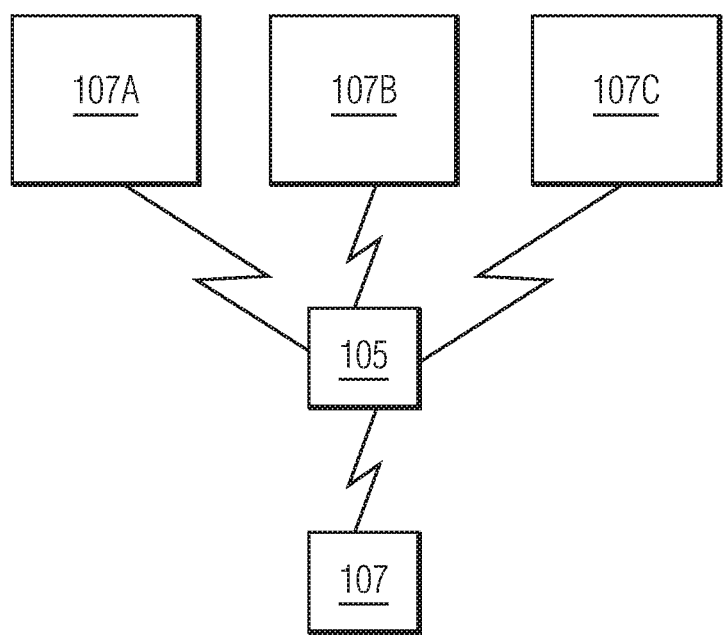
FIG. 1C is a block diagram of the example environment with multiple facilities managed by the washroom installation device.

The data processing apparatus 102 generates, for each facility 107 in an environment 100, such as for a floor of a multi-floor building, a building or set of buildings, configuration data for the end point devices 104 that associate the end point devices 104 with the respective facility 107 based on a first protocol 111. For example, the configuration data include a name for each end point device 104 and an association between the end point device 104 and the facility 107 or building in which that device 104 is located. The name of the device 104 uniquely or quasi-uniquely identifies the device 104 in the environment 100. FIG. 1C is a block diagram of the example environment 100 with multiple facilities 107A-C managed by the data processing apparatus 102. In some implementations, the first protocol 111 (including the sequence 109), as described in more detail below, is the same for each facility 107 regardless of the types or number of end point devices 104.

The mobile installation tool 105, for each facility 107, communicates, e.g., wirelessly, installation data to the data processing apparatus 102 for use by the data processing apparatus 102 with a first protocol 111 that defines one or more rules for generating the naming information for the devices 104 based on (i) a sequence of the end point devices 104 according to the spatial orientations of the end point devices 104 (in their respective facility 107) and (ii) a reference defining a starting point for the sequence 109. The installation data specify an identifier of the device 104 (e.g., a serial number or MAC address of the device 104) and (in some implementations) the relative location of each device 104 in the facility 107. In some implementations, the relative location of each device 104 is conveyed to the data processing apparatus 102 by the order in which the installation data for a device is sent by the mobile installation tool 105. For example, as described in more detail below, the data processing apparatus 102 interprets that the first installation data received for a device 104 in a facility 107 has a relative position descriptor of "1," the second installation data (e.g., next in time or next in a processing queue) received for another device 104 in the facility 107 has a relative position descriptor of "2" and so on.

In other implementations, the relative location of each device 104 is conveyed to the data processing apparatus 102 by identifying the device 104 as having a particular place/order in the sequence 109. For example, the installation data, as generated by the mobile installation tool 105 may associate each device 104 as having a place in the sequence 109 such as, for example, the first device in the sequence 109 having a sequence order number of 1 and the third device in the sequence 109 having a sequence order number of 3.

In some implementations, the mobile installation tool 105 is a computer program that, for example, is running on a mobile computing system such as a smart phone, tablet or laptop. Such a computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment.

Figure 2:
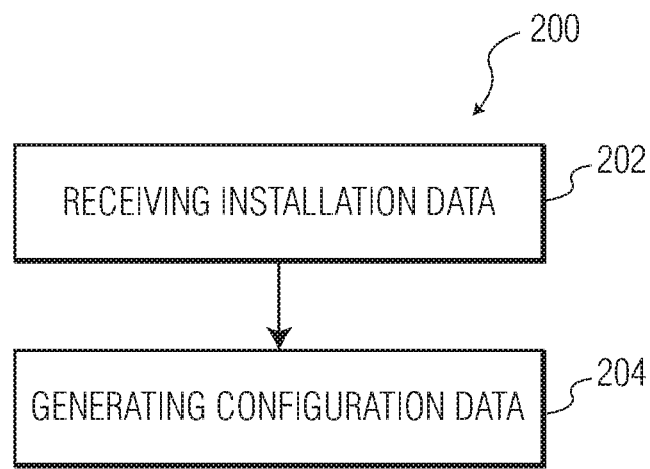
FIG. 2 is an example method of generating configuration data for a facility.

The operation of the data processing apparatus 102 and mobile installation tool 105 are described in more detail below with reference to FIG. 2, which is an example method 200 of generating configuration data for a facility 107.

Installation data is received, by a data processing apparatus, from a mobile installation tool (202). For example, the mobile installation tool 105 sends the installation data, for one or more devices 104 in a facility 107, to the data processing apparatus 102. The mobile installation tool 105 can be used, for example, by a user to join a device 104 to a network covering the facility 107 in which that device is (or is to be) located. In this scenario, for example, the user could use the mobile installation tool 105 to input a device identifier of the device 104, device make and model information, device type (e.g., hand towel dispenser or soap dispenser) and (or at least) relative device location information (e.g., first device from the door in a clockwise direction or "1" or "A," and/or men's first floor washroom in building X). The user could input such information into the tool 105 by, for example, typing the information through a keypad, using a graphical user interface to select from pre-defined options, reading/scanning a machine readable code (e.g., bar code or QR code), and/or using an near-field communication (NFC) process (or other wireless protocol/process such as a BLUETOOTH scheme) to query the device 104 and obtain the information. In some implementations, the devices 104 will include a communication handshake initiation function that can broadcast the relevant information in response to a request, e.g., activating a push button on the device or receiving a wirelessly broadcast command.

The mobile installation tool 105 can send this installation data to the data processing apparatus 102 after it is gathered from each device, after such data is gathered for all devices 104 in the facility, floor or building or at some intermediate points, e.g., after gathering the information for two of four devices 104 in the facility 107, or at the user's direction.

Configuration data is generated, for each facility, for a plurality of end point devices at the facility, that associate the end point devices with the respective facility based on a first protocol and the installation data (204). For example, the data processing apparatus 102 generates the configuration data based on the installation data received from the mobile installation tool 105, as described above. The configuration data specify naming information for each of the end point devices 104 to uniquely identify each end point device (e.g., with respect to a facility 107, a building floor with more than one facility 107, a building having multiple floors, a set of buildings or across all devices 104). The naming information generation process is described in more detail below.

For any given facility 107 each of the end point devices 104 has a spatial orientation defining its position relative to a position of at least one other of the end point devices 104 (in a same facility) and/or another point of reference in the facility 107, e.g., a door or entryway 103 into or out of the facility 107. For example, with respect to the facility 107 in FIG. 1A, the device 104$b_i$ is between the door 103 and the device 104$b_{ii}$. Or, with respect to a central reference point 119 in the facility 107, the device 104$b_i$ is the first device from the door 103 (e.g., a starting point) in a clockwise direction (e.g., along path 115). Likewise, the device 104$b_{ii}$ is the third device from the door 103 in the clockwise direction, and the device 104$c_{ii}$ is the sixth device from the door 103 in the clockwise direction.

With respect to a counterclockwise direction from the door 103, the device 104$a_{ii}$ is the first device and the device 104$c_{ii}$ is the second device. Other spatial orientation schemes are also envisioned. For example, the incrementing can be based on the type of device 104 in the facility 107 such that each common set of device types is numbered 1 to X, e.g., bath tissue dispenser 1 to X, hand towel dispenser 1 to X, hand soap dispenser 1 to X. In some implementations at least one facility 107 in a floor or building includes at least two different types of end point devices 104. The spatial orientation information is conveyed to the data processing apparatus 102 in the installation data from the mobile installation device 104, and the data processing apparatus 102 uses this orientation information and the first protocol 111 to generate the names of the devices 104.

The first protocol 111 defines one or more rules for generating the naming information based on (i) a sequence 109 of the end point devices 104 (e.g., based on the spatial orientations of the end point devices) and (ii) a reference defining a starting point 113 for the sequence 109. The sequence 109 defines the order in which the devices 104 are processed (e.g., named) based on the spatial orientation of the devices 104, e.g., in a clockwise or counterclockwise direction around the facility 107. The starting point 113 is used to identify the first device 104 in the sequence 109. For example, the starting point 113 can specify that the first device in the sequence 109 is the device closest to the door 103 (or other reference point in the facility 107) in a clockwise direction (or counterclockwise direction).

The rules can be programmatically defined, e.g., by an administrator in program code or scripts, and/or be fully or partially manually specified by an administrator. The rules can also specify additional naming conventions. For example, in the context of washroom facilities in a building, the convention can be "washroom gender/floor number-device type-device position in sequence," where washroom gender is male (M), female (FE) or family (FA); floor is the floor number on which the facility 107 is located so first floor would be 1, second floor would be 2 and so on; device type is the type of device such as hand towels dispenser (HT), bath tissue dispenser (BT), soap dispenser (SO) and so on; and device position in sequence is the number of the device in the sequence as described above.

Thus for a hand towel dispenser in the men's washroom on the first floor located second from the door according to the sequence 109 then the data processing apparatus 102 would name the device M1-HT-2. Likewise for a soap dispenser in the women's washroom on the third floor located third from the door according to the sequence then the data processing apparatus 102 would name the device W3-SO-3. In this way, for example, when a service attendant for the building receives a message indicating that a hand towel dispenser 104 needs to be serviced, e.g., because it is low on paper, the name of the dispenser 104 in the message informs the attendant as to the specific location of the dispenser 104, and the attendant can go directly to that dispenser 104 without having to cross-check or consult another database or list. This further allows for a compact message, as opposed to including in the message a longer written description in prose, which requires additional bandwidth to transmit and is less efficient.

In some scenarios multiple of the same room type (e.g., two men's washrooms) may be on a single floor. Thus in some implementations, for example, the rules specify the following naming convention: "washroom gender/floor number-facility name qualifier-device type-device position in sequence," where the facility name qualifier can be set by an administrator or user. In some implementations, the qualifier is descriptive so as to immediately impart location information. For example, if the floor includes men's washrooms on the South and North sides of the building then the respective qualifier could be southside or northside. As such, for a hand towel dispenser in the men's washroom on the southside of the first floor located second from the door according to the sequence and a hand towel dispenser in the men's washroom on the northside of first floor located fourth from the door according to the sequence then the data processing apparatus 102 would name the devices, respectively, M1-southside-HT-2 and M1-northside-HT-4. The above examples have focused on washrooms but other types of facilities and devices are also envisioned such as, for example, devices in an office, break room, manufacturing area, food preparation area, etc.

Figure 3:
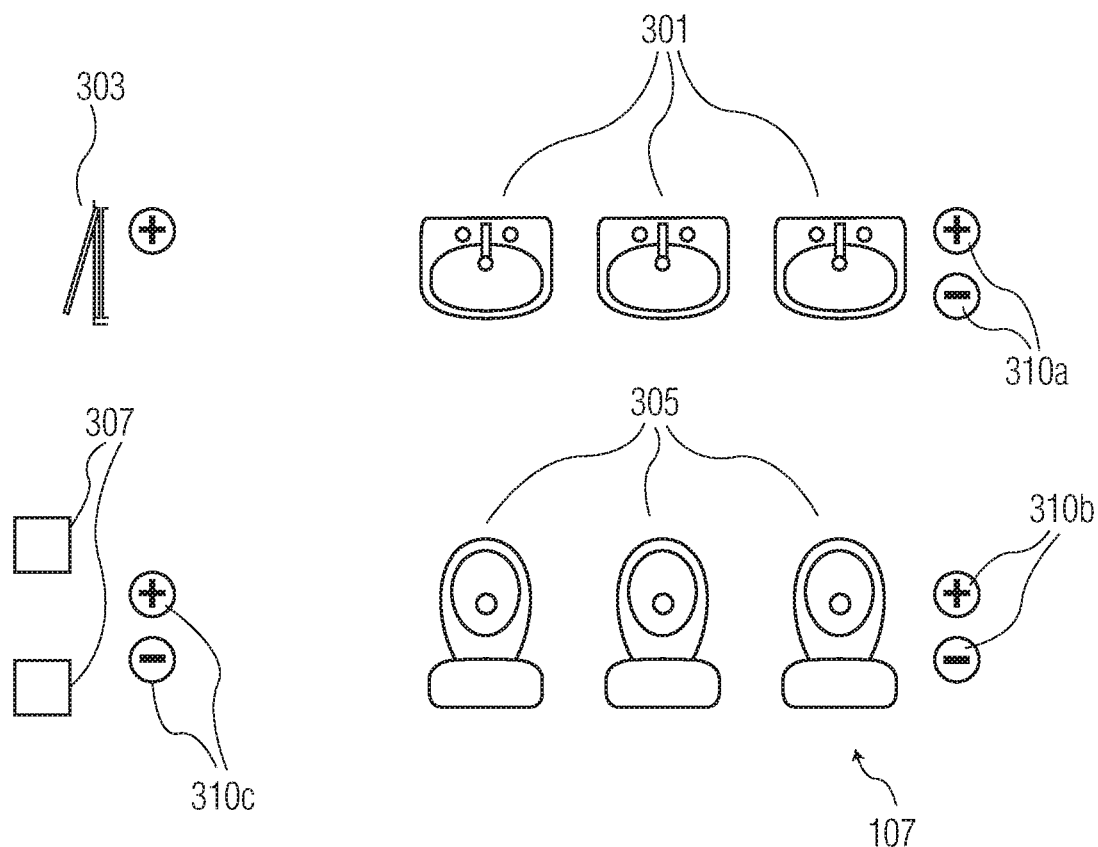
FIG. 3 is a representation of an example facility.

In some implementations, the mobile installation tool 105 is configured to provide a graphical user interface 150 to present a user with options to select and arrange end point devices 104 in the spatial orientations to reflect a layout of a facility 107. FIG. 3 is a representation of an example facility 107. More specifically, FIG. 3 shows a screen of a viewing device, e.g., a smartphone, tablet or computer, displaying a representation of a facility 107 with three soap dispensers 301, a door 303, three bath tissue dispensers 305 and two towel dispensers 307. The mobile installation tool 105 can provide such a graphical user interface. The layout, e.g., spatial relationship, of the various items, i.e., 301-307, in the facility 107 are accurately reflected in this representation, and can be manipulated, e.g., rearranged, by a user through use of a graphical user interface of mobile installation tool 105 by, for example, drag and drop type functionality provided by the mobile installation tool 105.

Generally, the graphical user interface of the mobile installation tool 105 provides a user the ability to select a device 104 or reference point, e.g., from a menu, and place it in its relative position in the representation of the facility 107 on the screen. It also allows the user to increase or decrease the number of a particular type of device, e.g., through the increase or decrease device buttons 310 next to the particular device type 104. For example, to add another soap dispenser 301 the user would select the increase bottom from the button set 310a, and to remove a bath tissue dispenser 305 the user would select the decrease bottom from the button set 310b. Further once the devices 104 are placed on the representation the user can move them around to reflect their actual position relative to each other and the reference point, e.g., through a clicking and dragging process.

Once placed in the representation, the user can, through interaction with the graphical user interface, select each device 104 and collect an identifier, e.g., a MAC address or serial number, of the device 104 for use to generate the installation data. For example, the user can use the mobile installation tool 105 to a select a given device 104 on the representation and to scan and input the serial number of each device 104. In the way the mobile installation tool 105 associates the devices 104 with their respective positions in the facility 107 and their respective identifiers. Once the installation data is available, the mobile installation tool 105 send such data to the data processing apparatus 102 for generation of the configuration data, as described above.

Embodiments

Embodiment 1. A system comprising: a data processing apparatus configured to generate, for each of a plurality of facilities, configuration data for end point devices at each facility that associate the end point devices with the respective facility based on a first protocol, wherein: each of the end point devices has a spatial orientation defining its position relative to a position of at least one other of the end point devices in a same facility, the configuration data specify naming information for each of the end point devices to uniquely identify each end point device; and each facility includes at least two different types of end point devices; a mobile installation tool configured, for each facility, to wirelessly communicate installation data to the data processing apparatus for use with the first protocol, wherein the first protocol defines one or more rules for generating the naming information based on (i) a sequence of the end point devices based on the spatial orientations of the end point devices and (ii) a reference defining a starting point for the sequence; and wherein the sequence is the same for each facility regardless of the types or number of end point devices.

Embodiment 2. The system of embodiment 1, wherein the reference is a door.

Embodiment 3. The system of any proceeding embodiment, wherein the sequence is a counterclockwise rotation starting from the reference to an end point device nearest the reference to any then next closest end point devices, in succession, to a last end point device nearest the reference from a clockwise perspective.

Embodiment 4. The system of any proceeding embodiment wherein the facilities include a washroom.

Embodiment 5. The system of any proceeding embodiment, wherein the end point devices include one or more of a hand towel dispenser, bath tissue dispenser, and hand soap dispenser.

Embodiment 6. The system of any proceeding embodiment, wherein the mobile installation tool is configured to provide a graphical user interface to present a user with options to select and arrange end point devices in the spatial orientations to reflect a layout of a facility.

Embodiment 7. The system of any proceeding embodiment, wherein the sequence is a clockwise rotation starting from the reference to an end point device nearest the reference to any then next closest end point devices, in succession, to a last end point device nearest the reference from a counterclockwise perspective.

Embodiment 8. A method comprising: receiving, by a data processing apparatus, installation data from a mobile installation tool; and generating, by the data processing apparatus, for each of a plurality of facilities, configuration data for end point devices at each facility that associate the end point devices with the respective facility based on a first protocol and the installation data, wherein: each of the end point devices has a spatial orientation defining its position relative to a position of at least one other of the end point devices in a same facility, the configuration data specify naming information for each of the end point devices to uniquely identify each end point device; and the first protocol defines one or more rules for generating the naming information based on (i) a sequence of the end point devices based on the spatial orientations of the end point devices and (ii) a reference defining a starting point for the sequence.

Embodiment 9. The method of embodiment 8, wherein the mobile installation tool is configured to provide a graphical user interface to present a user with options to select and arrange end point devices in the spatial orientations to reflect a layout of a facility.

Embodiment 10. The method of any of embodiments 8-9, wherein the reference is a door.

Embodiment 11. The method of any of embodiments 8-10, wherein the sequence is a clockwise rotation starting from the reference to an end point device nearest the reference to any then next closest end point devices, in succession, to a last end point device nearest the reference from a counterclockwise perspective.

Embodiment 12. The method of any of embodiments 8-11, wherein the sequence is a counterclockwise rotation starting from the reference to an end point device nearest the reference to any then next closest end point devices, in succession, to a last end point device nearest the reference from a clockwise perspective.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A system comprising:
    a data processing apparatus configured to generate, for each of a plurality of facilities, configuration data for end point devices at each facility that associate the end point devices with the respective facility based on a first protocol, wherein:
        each of the end point devices has a spatial orientation defining its position relative to a position of at least one other of the end point devices in a same facility,
        the configuration data specify naming information for each of the end point devices to uniquely identify each end point device; and
        each facility includes at least two different types of end point devices;
    a mobile installation tool configured, for each facility, to wirelessly communicate installation data to the data processing apparatus for use with the first protocol, wherein the first protocol defines one or more rules for generating the naming information based on (i) a sequence of the end point devices based on the spatial orientations of the end point devices and (ii) a reference defining a starting point for the sequence; and
    wherein the sequence is the same for each facility regardless of the types or number of end point devices.

2. The system of claim 1, wherein the reference is an entryway.

3. The system of claim 1, wherein the sequence is a counterclockwise rotation starting from the reference to an end point device nearest the reference to any then next closest end point devices, in succession, to a last end point device nearest the reference from a clockwise perspective.

4. The system of claim 1 wherein the facilities include a washroom.

5. The system of claim 4, wherein the end point devices include one or more of a hand towel dispenser, bath tissue dispenser, and hand soap dispenser.

6. The system of claim 1, wherein the sequence is a clockwise rotation starting from the reference to an end point device nearest the reference to any then next closest end point devices, in succession, to a last end point device nearest the reference from a counterclockwise perspective.

7. A system comprising:
a data processing apparatus configured to (i) generate, for each of a plurality of facilities, configuration data for end point devices at each facility that associate the end point devices with the respective facility based on a first protocol and (ii) communicate with a mobile installation tool to receive installation data for use with the first protocol, and
wherein:
  each of the end point devices has a spatial orientation defining its position relative to a position of at least one other of the end point devices in a same facility,
  the configuration data specify naming information for each of the end point devices to uniquely identify each end point device; and
  the first protocol defines one or more rules for generating the naming information based on (i) a sequence of the end point devices based on the spatial orientations of the end point devices and (ii) a reference defining a starting point for the sequence.

8. The system of claim 7, wherein the reference is a door.

9. The system of claim 7, wherein the sequence is a clockwise rotation starting from the reference to an end point device nearest the reference to any then next closest end point devices, in succession, to a last end point device nearest the reference from a counterclockwise perspective.

10. The system of claim 7, wherein the sequence is a counterclockwise rotation starting from the reference to an end point device nearest the reference to any then next closest end point devices, in succession, to a last end point device nearest the reference from a clockwise perspective.

11. A method comprising:
receiving, by a data processing apparatus, installation data from a mobile installation tool; and
generating, by the data processing apparatus, for each of a plurality of facilities, configuration data for end point devices at each facility that associate the end point devices with the respective facility based on a first protocol and the installation data, wherein:
  each of the end point devices has a spatial orientation defining its position relative to a position of at least one other of the end point devices in a same facility,
  the configuration data specify naming information for each of the end point devices to uniquely identify each end point device; and
  the first protocol defines one or more rules for generating the naming information based on (i) a sequence of the end point devices based on the spatial orientations of the end point devices and (ii) a reference defining a starting point for the sequence.

12. The method of claim 11, wherein the reference is a door.

13. The method of claim 11, wherein the sequence is a clockwise rotation starting from the reference to an end point device nearest the reference to any then next closest end point devices, in succession, to a last end point device nearest the reference from a counterclockwise perspective.

14. The method of claim 11, wherein the sequence is a counterclockwise rotation starting from the reference to an end point device nearest the reference to any then next closest end point devices, in succession, to a last end point device nearest the reference from a clockwise perspective.

* * * * *